(12) United States Patent
Araki et al.

(10) Patent No.: US 9,850,175 B2
(45) Date of Patent: Dec. 26, 2017

(54) METHOD FOR MACHINING CERAMIC MATRIX COMPOSITE

(71) Applicant: IHI Corporation, Koto-ku (JP)

(72) Inventors: Takahito Araki, Tokyo (JP); Masaharu Yano, Tokyo (JP); Kuniyuki Imanari, Tokyo (JP); Kouta Ishitsu, Tokyo (JP); Takashi Ueda, Ishikawa (JP); Akira Hosokawa, Ishikawa (JP); Tatsuaki Furumoto, Ishikawa (JP)

(73) Assignee: IHI Corporation, Koto-ku (JP)

( * ) Notice: Subject to any disclaimer, the term of this patent is extended or adjusted under 35 U.S.C. 154(b) by 308 days.

(21) Appl. No.: 14/843,453

(22) Filed: Sep. 2, 2015

(65) Prior Publication Data

US 2015/0376073 A1 Dec. 31, 2015

Related U.S. Application Data

(63) Continuation of application No. PCT/JP2014/056191, filed on Mar. 10, 2014.

(30) Foreign Application Priority Data

Mar. 8, 2013 (JP) ................................ 2013-047290

(51) Int. Cl.
*B23P 25/00* (2006.01)
*B23C 3/00* (2006.01)
(Continued)

(52) U.S. Cl.
CPC ............ *C04B 41/0036* (2013.01); *B23C 3/00* (2013.01); *B23C 9/00* (2013.01); *B23K 26/0006* (2013.01);
(Continued)

(58) Field of Classification Search
CPC ....... B23P 25/006; B23P 25/003; B23P 25/00; B23K 26/0093; B23K 2203/52; Y10T 29/5105; Y10T 29/5107
(Continued)

(56) References Cited

U.S. PATENT DOCUMENTS 4,261,675 A 4/1981 Zankl
5,906,459 A * 5/1999 Thomas .................... B23C 3/00
219/121.6

(Continued)

FOREIGN PATENT DOCUMENTS

CN 1107087 A 8/1995
CN 1788916 A 6/2006
(Continued)

OTHER PUBLICATIONS

English translation of the Written Opinion for PCT/JP2014/056191, dated Apr. 22, 2014.*
(Continued)

*Primary Examiner* — Erica E Cadugan
(74) *Attorney, Agent, or Firm* — Oblon, McClelland, Maier & Neustadt, L.L.P.

(57) ABSTRACT

A method for machining a ceramic matrix composite (CMC), the method enhancing a machining speed for the ceramic matrix composite (CMC), includes: a step of scanning an irradiated portion of a surface of a machining target material by a laser head to irradiate the irradiated portion with laser light from the laser head, and forming a deteriorated layer on the irradiated portion of the surface of the machining target material; and a step of sequentially removing the deteriorated layer by an end mill, the deteriorated layer being formed on the irradiated portion, wherein the deteriorated layer is formed by heating the irradiated portion up to a predetermined temperature by irradiation of continu-
(Continued)

ous oscillation laser light, and by forming a crack by irradiation of pulsed oscillation laser light.

4 Claims, 9 Drawing Sheets (51) Int. Cl.
 B23K 26/34 (2014.01)
 C04B 41/00 (2006.01)
 B23C 9/00 (2006.01)
 B23K 26/00 (2014.01)
 B23K 26/082 (2014.01)
 C04B 41/53 (2006.01)
 B23K 103/00 (2006.01)
(52) U.S. Cl.
 CPC ...... B23K 26/0066 (2013.01); B23K 26/0093 (2013.01); B23K 26/082 (2015.10); B23P 25/006 (2013.01); C04B 41/009 (2013.01); C04B 41/53 (2013.01); B23C 2222/61 (2013.01); B23C 2226/18 (2013.01); B23C 2226/27 (2013.01); B23K 2203/52 (2015.10); Y10T 29/5107 (2015.01); Y10T 409/303808 (2015.01); Y10T 409/304032 (2015.01)
(58) Field of Classification Search
 USPC .............................................. 29/26 R, 26 A
 See application file for complete search history.

(56) References Cited

U.S. PATENT DOCUMENTS

| 6,438,996 | B1 | 8/2002 | Cuvelier | |
| 6,476,347 | B1* | 11/2002 | Whittenbury | B23P 25/006 144/212 |
| 8,053,705 | B2* | 11/2011 | Shin | B23P 25/006 219/121.72 |
| 2003/0059268 | A1 | 3/2003 | Zimmermann et al. | |
| 2004/0104207 | A1 | 6/2004 | Wu et al. | |
| 2007/0169325 | A1 | 7/2007 | Jancso | |
| 2008/0237205 | A1* | 10/2008 | Kobayashi | B23K 26/389 219/121.71 |
| 2013/0032015 | A1* | 2/2013 | Nishikawa | B23K 26/0093 83/16 |
| 2016/0101492 | A1* | 4/2016 | Chuang | B23P 25/006 409/136 |

FOREIGN PATENT DOCUMENTS

| CN | 101274402 A | 10/2008 |
| DE | 103 24 338 A1 | 12/2004 |
| FR | 2 946 552 A1 | 12/2010 |
| JP | 57-54001 A | 3/1982 |
| JP | 60-44207 A | 3/1985 |
| JP | 61-152345 A | 7/1986 |
| JP | 04-037492 A | 2/1992 |
| JP | 09-155602 A | 6/1997 |
| JP | 10-113815 A | 5/1998 |
| JP | 2002-510271 A | 4/2002 |
| JP | 2003-019615 A | 1/2003 |
| JP | 2005-082414 A | 3/2005 |
| JP | 2007-196373 A | 8/2007 |
| JP | 2008-081379 A | 4/2008 |
| JP | 2010-138046 A | 6/2010 |
| WO | WO-2010/142747 A1 * | 12/2010 |

OTHER PUBLICATIONS

Machine Translation of WO 2010/142747-A1, which WO '747 was published Dec. 16, 2010.*
Extended European Search Report dated Jan. 3, 2017 in Patent Application No. 14759821.3.
"Perspektiven für die Fertigung von morgen. Werkzeuge für neue Werkstoffe und Technologien" WT Produktion und Management, vol. 83, No. 10, XP000408718, Oct. 1, 1993, pp. 19-20, 22.
International Search Report dated Apr. 22, 2014 in PCT/JP2014/056191 filed Mar. 10, 2014 with English translation.
Written Opinion dated Apr. 22, 2014 in PCT/JP2014/056191 filed Mar. 10, 2014.
Toshio Ogasawara, "Recent Research Activities regarding SiC-Based Ceramic Composites for Aerospace Applications," Journal Plasma and Fusion Research, vol. 80, No. 1, 2004, pp. 36-41.
Shuichi I'Ida, et al, "Table of Physical Constants," Asakura Shoten, 1969, 4 Pages (with English translation of table).
Combined Chinese Office Action and Search Report dated Jun. 23, 2016 in Patent Application No. 201480011773.8 (with English language translation of categories of cited documents).

* cited by examiner

METHOD FOR MACHINING CERAMIC MATRIX COMPOSITE

CROSS REFERENCE TO THE RELATED APPLICATIONS

This application is a continuation application of international application No. PCT/JP2014/056191, filed on Mar. 10, 2014, which claims priority to Japanese Patent Application No. 2013-047290, filed on Mar. 8, 2013, each of which is hereby incorporated by reference in their entity.

TECHNICAL FIELD

The present invention relates to a method for machining a method for machining ceramic matrix composite,

BACKGROUND ART

Heretofore, a nickel base superalloy has been used for a high-temperature structural member for use in an airplane engine and the like; however, from viewpoints of weight reduction, lifetime improvement, fuel efficiency improvement and the like, a composite material that replaces the nickel base superalloy has been studied, and a ceramic matrix composite (CMC) in which ceramic fiber is cured by ceramics has attracted attention (refer to the following Patent Literature 1).

The ceramic matrix composite is compounded with the ceramic fiber to make up for low ductility, which is a disadvantage thereof, while making use of high heat resistance, high rigidity, high abrasion resistance, high chemical resistance and the like, which are advantages of the ceramics, and the ceramic matrix compound can be used in a much higher-temperature environment that the nickel base superalloy. For the ceramic matrix composite, large improvement of fuel efficiency can be expected (refer to the following Non-Patent Literature 1).

Since this ceramic matrix composite is a difficult-to-cut material, the ceramic matrix composite has heretofore been subjected to surface machining by grinding, it has been difficult to cut/machine the ceramic matrix composite by an end mill, a drill and the like, and a lifetime of each of such tools has also been short. For example, in a case of machining the ceramic matrix composite by a cutting tool or a grindstone, a material removal amount becomes no more than 0.06 cc/min, and continuous machining has been impossible.

As a method for improving a ceramic-based or metal-based difficult-to-machine material such as the ceramic matrix composite, laser-assisted machining is provided. This laser-assisted machining includes: (1) a method of cutting a metal material by irradiating the metal material with pulsed oscillation laser light (refer to the following Patent Literature 2); (2) a method of generating cracks on a surface of a cutting target material and forming an embrittled layer by rapid heating/rapid cooling for a high-hardness material and a high-brittleness material (refer to the following Patent Literature 3); (3) milling by laser assistance (refer to the following Patent Literature 4); and the like.

CITATION LIST

Patent Literature

Patent Literature 1: Japanese Patent Laid-Open Publication No. 2008-81379

Patent Literature 2: Japanese Patent Laid-Open Publication No. H09-155602

Patent Literature 3: Japanese Patent Laid-Open Publication No. S61-152345

Patent Literature 4: Japanese Patent Laid-Open Publication No. H10-113815

Non-Patent Literature

Non-patent Literature 1: OGASAWARA Toshio, "Recent Research Activities regarding SiC-Based Ceramic Composites for Aerospace Applications", Journal of Japanese Plasma/Nuclear Fusion Society, 2004, Vol. 80, No. 1, pp. 36 to 41

Non-patent Literature 2: edited by IIDA Shuichi, "Physical Constants Table", Asakura Publishing Co., Ltd., 1969, p. 199

SUMMARY OF INVENTION

Problems to be Solved by Invention

However, with regard to the above-described laser-assisted machining, the method of (1) is characterized in lowering strength of the cutting target material and cutting chips at a fixed interval by intermittently performing laser irradiation and heating for a surface of a slope obtained by an end cutting edge angle of a tool. The method of (1) is to enhance chip controllability, and efficiency of a cutting ability thereof has been limited.

In the method of (2), cracks with an effective size are generated in monolithic ceramics which are not subjected to fiber reinforcement; however, a crack propagation effect thereof has been low for the ceramic matrix composite. The method of (3) is characterized in heating a critical region by a mechanical impact by a laser-assisted machining method specialized for the milling, and accordingly, the tool and the machining shape have been limited.

The present invention is proposed in consideration of the above-described actual circumstances. It is an object of the present invention to provide a method for machining a ceramic matrix composite, which enhances a machining speed for the ceramic matrix composite, and extends a lifetime of a machining tool. Moreover, it is another object of the present invention to provide a method for machining a ceramic matrix composite, which enhances the cutting ability, has a high crack propagation effect, and does not impose limitations on the tool and the machining shape.

Means for Solving Problems

In order to solve the above-mentioned problems, a method according to the present invention is a method for machining a ceramic matrix composite, the method including: a step of scanning an irradiated portion of a surface of a machining target material by laser light to irradiate the irradiated portion with the laser light, and forming a deteriorated layer (embrittled surface layer portion) on the irradiated portion of the surface of the machining target material; and a step of sequentially removing the deteriorated layer, which is formed on the irradiated portion, by a machining tool such as an end mill, wherein the deteriorated layer is formed by heating the irradiated portion up to a predetermined temperature by irradiation of continuous oscillation laser light, and by forming a crack by irradiation of pulsed oscillation laser light.

At this time, the predetermined temperature is a temperature at which a thermally denatured layer can be formed on the surface of the ceramic matrix composite. For example, a type with a low-grade heat resistance, which belongs to SiC fiber or matrix made of a polymer material, starts to be thermally decomposed at approximately 1300° C. to 1400° C., and the thermally denatured layer is formed therein.

In the step of removing the deteriorated layer, preferably, the deteriorated layer formed on the irradiated portion is sequentially removed by the machining tool that follows the irradiated portion apart from the irradiated portion by a predetermined distance. Preferably, the machining tool is an end mill.

At this time, the predetermined distance is a distance at which a thermal effect given to the tool is reduced as much as possible in a case of forming the thermally denatured layer on the surface of the ceramic matrix composite.

Preferably, in the step of forming a deteriorated layer, the deteriorated layer is formed in a predetermined region of the surface of the machining target material, and in the step of removing the deteriorated layer, the deteriorated layer is removed after the deteriorated layer is formed in the predetermined region. Preferably, the machining tool is an end mill.

Advantageous Effects of Invention

In accordance with the present invention, the machining speed for the ceramic matrix composite is enhanced. Moreover, the lifetime of the tool is also extended. Furthermore, the cutting ability can be enhanced, the crack propagation effect can be made high, and no limitations can be imposed on the tool and the machining shape.

MODES FOR CARRYING OUT INVENTION

A description is made below in detail of an embodiment of a method for machining a ceramic matrix composite according to the present invention with reference to the drawings. Such a machining method is for cutting/machining the ceramic matrix composite (CMC) by laser assistance.

In this embodiment, there is investigated a possibility of laser-assisted machining of locally heating a surface of the ceramic matrix composite by employing a laser, and cutting a heated portion thereby. Then, a surface temperature when the surface of the ceramic matrix composite is irradiated with the laser is measured by a radiation thermometer, and in addition, an influence given to a cutting ability by laser irradiation conditions is investigated.

Figure 1:
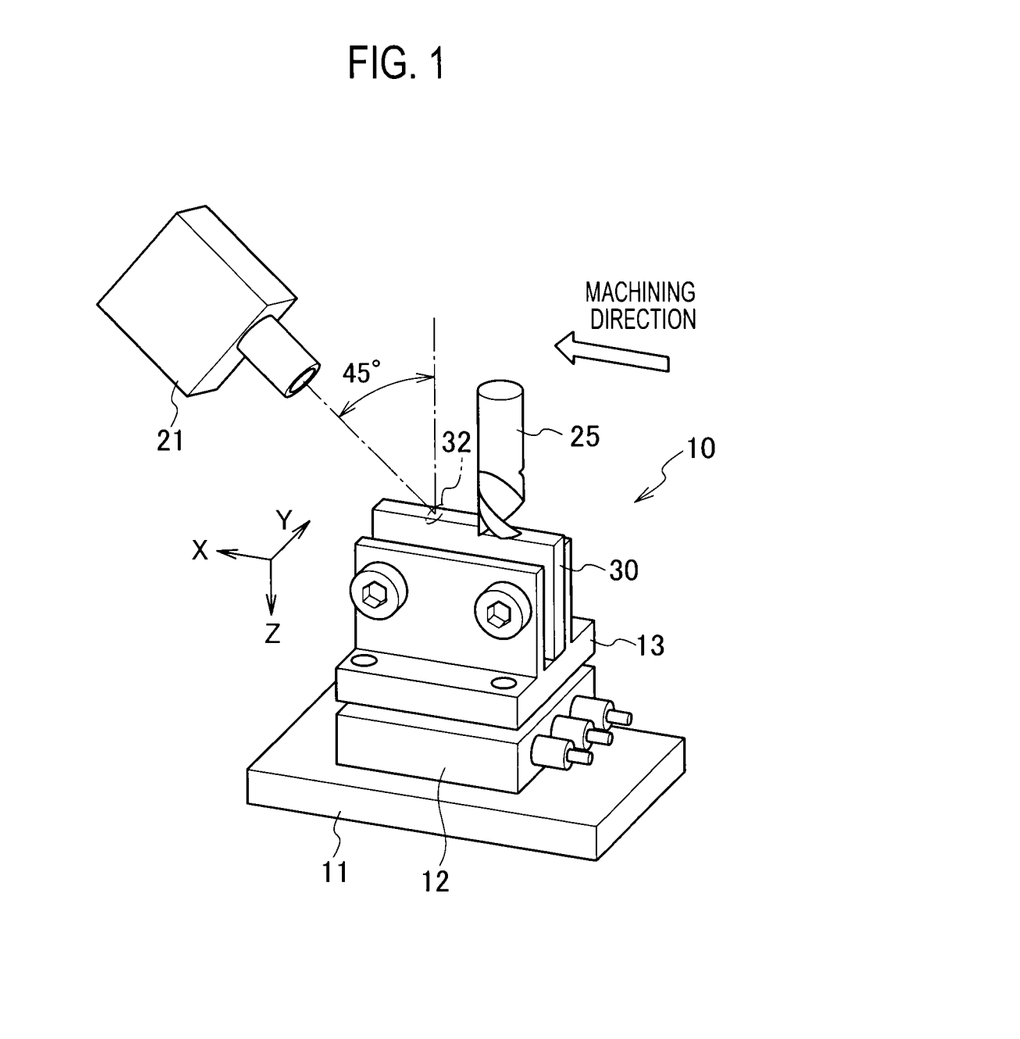
FIG. 1 is a view showing a schematic configuration of a machining apparatus.

FIG. 1 is a view showing a schematic configuration of a machining apparatus 10 that realizes the method for machining a ceramic matrix composite according to this embodiment. In this machining apparatus 10, a vise 13 is attached onto an upper surface of a table 11 via a tool dynamometer 12, and by this vise 13, a plate-like machining target material 30 with a thickness of 3 mm, which is made of a ceramic matrix composite, is fixed. For this machining apparatus 10, a machining center, a milling machine and the like can be used.

Onto a surface of the machining target material 30, laser light is irradiated from a laser head 21 in a direction inclined rearward by 45° from a feeding direction of the machining target material 30 while taking a normal line of the upper surface of the table 11 as a reference, and an irradiated portion 32 is formed on the surface of the machining target material 30. On the surface of the machining target material 30, a position apart from this irradiated portion 32 by a predetermined distance in the feeding direction is cut to an incision of 0.1 mm by an end mill 25 with a diameter of 6 mm. Note that a machining direction indicated by an arrow in the drawing corresponds to a reverse direction to the feeding direction.

The machining target material 30 moves at a predetermined feeding speed with respect to the laser head 21 and the end mill 25, in which individual positions are fixed. On the contrary, when the machining target material 30 is taken as a reference, the laser head 21 and the end mill 25 move at a predetermined speed, and the end mill 25 is made to follow the irradiated portion 32, which is irradiated with the laser light, apart therefrom by the predetermined distance. A moving direction of the laser head 21 and the end mill 25, which is as described above, is shown as the machining direction by the arrow in the drawing.

The laser light is placed so as to be rearward from a tip end of the end mill 25 with respect to the feeding direction of the machining target material 30, and is irradiated onto the irradiated portion 32 on a surface of an uncut surface of the machining target material 30, and the end mill 25 cuts the irradiated portion 32 that is locally heated. For the end mill 25, a super-steel flat end mill is used, and the number of revolutions of the end mill 25 is set at 6000 rpm in consideration of a natural frequency of the tool dynamometer 12.

In this machining apparatus 10, an xyz rectangular coordinate system is defined, and is set so that an xy plane can be parallel to the upper surface of the table 11, that a longitudinal direction of the machining target material 30 can be an x-axis direction, that a thickness direction thereof can be a y-axis direction, and that the normal line of the upper surface of the table 11 and a z-axis direction can be reverse to each other. Hence, an xy plane on the machining target material 30 becomes a machining surface subjected to such cutting/machining, the x-axis direction becomes the feeding direction of the machining target material 30, and the z-axis direction becomes a depth direction of the cutting.

Referring to this xyz coordinate system, the laser light irradiated from the laser head 21 is inclined by 45 degrees in the x-axis direction from the normal line of the upper surface of the table 11, and the end mill 25 is set along the z-axis direction as a depth direction of the cutting. Moreover, while taking the machining target material 30 as a reference, the laser head 21 and the irradiated portion 32 thereof move at the predetermined speed in the x-axis direction, and the end mill 25 moves following these at the predetermined speed in the x-axis direction. The laser light scans the xy plane, which becomes the machining surface, by the irradiated portion 32, and the end mill 25 cuts the machining target material 30 following such scanning by the irradiated portion 32.

Figure 2:
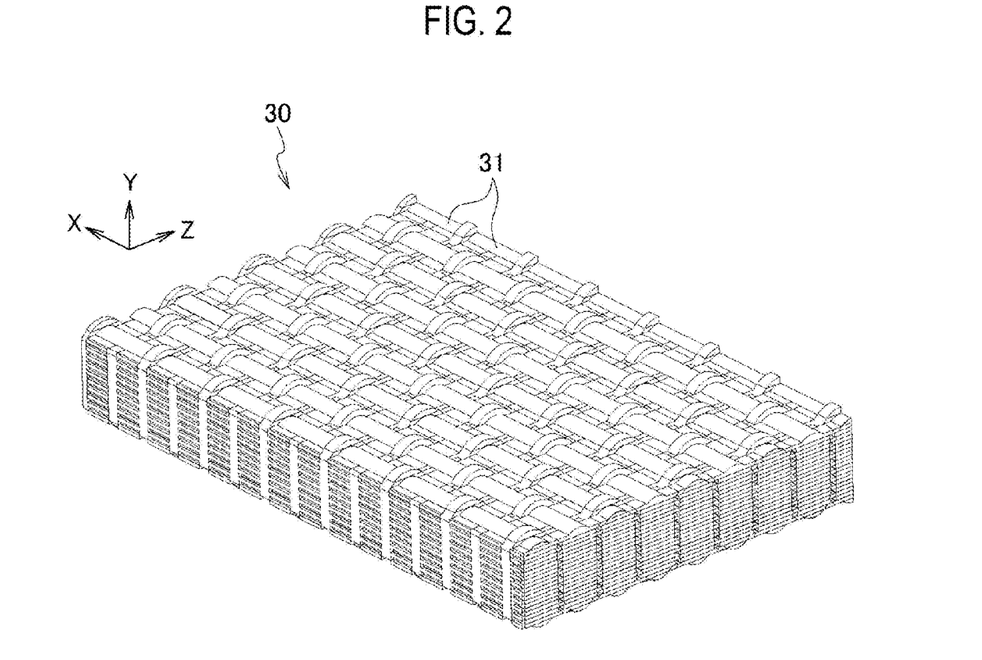
FIG. 2 is a view showing a ceramic matrix composite.

FIG. 2 is a view showing an example of the ceramic matrix composite that becomes the machining target material 30. This composite material is one formed by filling gaps of fabric of plate-like ceramic fiber 31 with ceramics, and compounding the fabric and the ceramics with each other. As the ceramic matric composite as described above, for example, one mentioned in the foregoing Patent Literature 1 can be used.

Also in this plate-like ceramic matrix composite, an xyz rectangular coordinate system is set, for example, so that a longitudinal direction of the ceramic matrix composite can be an x-axis direction, that a thickness direction thereof can be a y-axis direction, and that other direction can be a z-axis direction. Then, referring to such an xyz direction set as described above, the plate-like ceramic matrix composite can be attached onto the machining apparatus 10 so that the set xyz direction can be matched with the xyz direction set for the machining apparatus 10.

Figure 3:
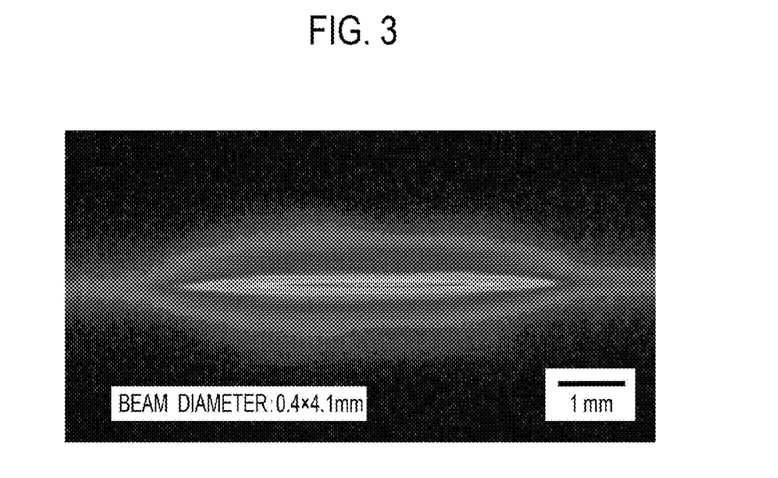
FIG. 3 is a view showing a shape of laser light (beam) on a surface of a machining target material.

FIG. 3 is a view showing a beam shape on the machining target material 30 attached onto the machining apparatus 10. In this drawing, intensity of the laser light is indicated by a gray scale. The irradiated portion 32 is ellipsoidal, in which a length in a minor axis direction is 0.4 mm, and a length in a major axis direction is 4.1 mm.

Figure 4:
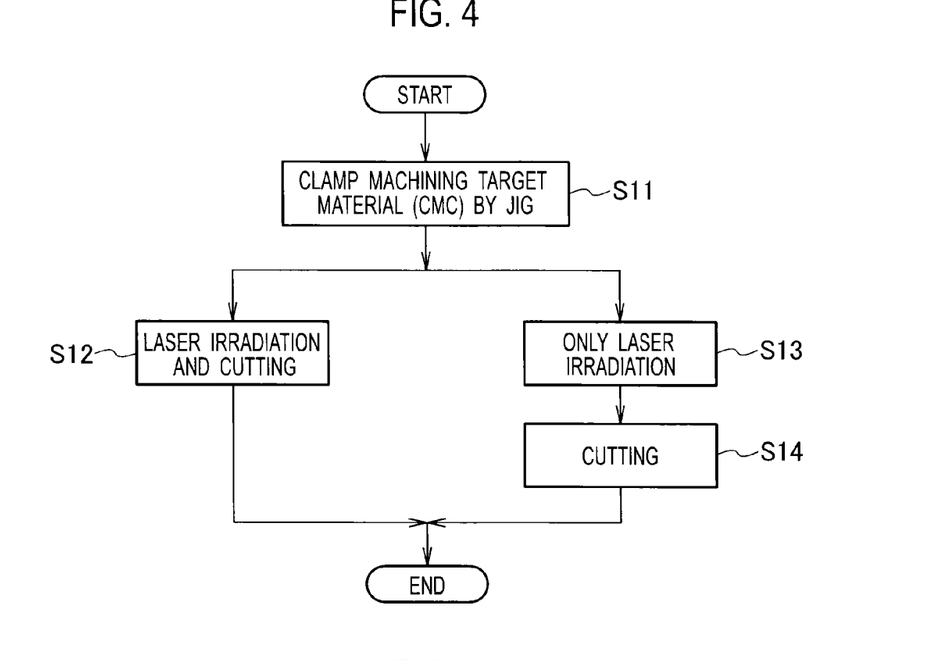
FIG. 4 is a flowchart showing a series of steps of machining the machining target material.

FIG. 4 is a flowchart showing a series of steps of machining the machining target material 30 by using this machining apparatus 10. In beginning Step S11, the machining target material 30 is attached onto the machining apparatus 10. The machining target material 30 is attached and fixed onto a jig such as the vise 13 provided on the upper surface of the table 11 of the machining apparatus 10.

From this Step S11, the steps are divided into two flows. A first flow proceeds to Step S12. In Step S12, the laser light is irradiated onto the machining target material 30, and in addition, the cutting for the machining target material 30 is performed. The machining target material 30 is fed at the predetermined speed with respect to the laser head 21 and the end mill 25, and the irradiated portion 32, which is formed on the surface of the machining target material 30, that is, the xy plane by the laser light irradiated from the laser head 21, is cut to a predetermined depth in the z-axis direction by the end mill 25 that follows the irradiated portion 32 apart rearward therefrom by the predetermined distance.

Here, by irradiation of continuous oscillation laser light onto the machining target material 30, the irradiated portion 32 on the surface thereof is heated up to a predetermined temperature to be thereby given a heat injury, and in addition, by irradiation of pulsed oscillation laser light with high energy, cracks are formed in the irradiated portion 32. By the irradiation of the continuous oscillation laser light and the irradiation of the pulsed oscillation laser light, a deteriorated layer with a predetermined depth in the z-axis direction is formed on the surface of the machining target material 30.

The end mill 25 removes the deteriorated layer formed on the surface of the machining target material 30. The deteriorated layer is subjected to the heat injury, and the cracks are formed in a texture thereof, and cutting resistance of the end mill 25 is reduced, and the deteriorated layer can be cut away at a high speed. For example, in comparison with the prior arts described in the foregoing Patent Literatures 2 to 4, a material removal speed of 50 times to 70 times is obtained, and for example, it becomes possible to implement machining equivalent to that for metal articles. Moreover, a lifetime of a machining tool such as the end mill 25 is also extended. Furthermore, the cutting ability is enhanced, the crack propagation effect is high, and the tool and the machining shape are not limited.

This Step S12 is not limited to such a case of fixing the laser head 21 and the end mill 25 and feeding the machining target material 30, and in Step S12, the machining target material 30 just needs to move relatively to the laser head 21 and the end mill 25. For example, the laser head 21 and the end mill 25 may be moved while fixing the machining target material 30, and both of a pair of the laser head 21 and the end mill 25 and the machining target material 30 may be moved.

Meanwhile, a second flow divided from Step S11 continues to Step S13, and in this Step S13, only the irradiation of the laser light is performed for the machining target material 30. The machining target material 30 is fed at the predetermined speed with respect to the laser head 21, and the surface of the machining target material 30, that is, the xy plane is scanned by the laser light irradiated from the laser head 21. In a predetermined region of the surface of the machining target material 30, the deteriorated layer is formed to the predetermined depth in the z-axis direction by the irradiation of the laser light, which is as described above.

Also in this Step S13, in a similar way to Step S12 described above, the irradiated portion 32 on the surface of the machining target material 30 is heated up to the predetermined temperature by the irradiation of the continuous oscillation laser light, whereby the heat injury is given thereto, and in addition, the cracks are formed in the irradiated portion 32 by the irradiation of the pulsed oscillation laser light with high energy, whereby the deteriorated layer is formed. After the deteriorated layer is formed in the predetermined region on the surface of the machining target material 30, the steps proceed to next Step S14.

In Step S14, the deteriorated layer formed in the predetermined region on the surface of the machining target material 30 is cut by the end mill 25. The machining target material 30 is fed at the predetermined speed with respect to the end mill 25, and the deteriorated layer formed on the surface in Step S13 is cut to the predetermined depth in the z-axis direction by the end mill 25.

Also in Step S14, in a similar way to Step S12, the deteriorated layer is subjected to the heat injury, and the cracks are formed in the texture thereof, and accordingly, the cutting resistance of the end mill 25 is reduced, and it becomes possible to perform high-speed cutting/machining. Moreover, the cutting ability is enhanced, the crack propagation effect is high, and the tool and the machining shape are not limited.

Note that, also in the foregoing Step S12 and S13, either of the pair of the laser head 21 and the end mill 25 and the machining target material 30 may be moved in a similar way to Step S11.

Step S12 in the first flow described above and Steps S13 and S14 in the second flow described above can be repeatedly performed until the cutting depth of the surface of the machining target material 30 in the z-axis direction reaches a desired value. Moreover, the first flow and the second flow can be performed alternately.

Note that, in this embodiment, it is assumed that, in accordance with Step S11 and Step S12 in the first flow, the laser light is irradiated onto the machining target material 30, and in addition, the machining target material 30 is cut.

Figure 5:
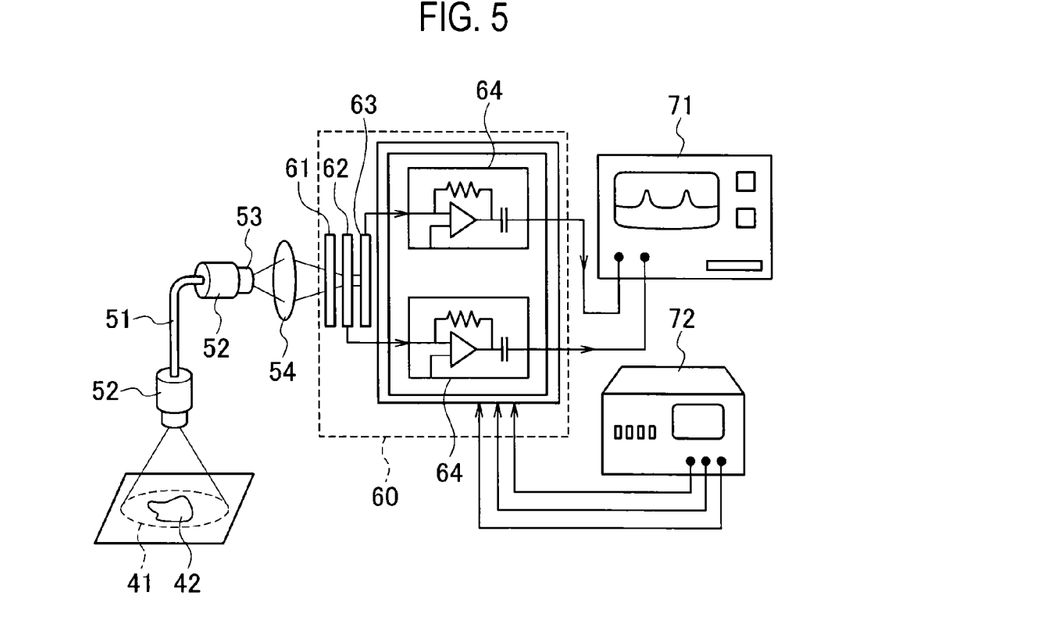
FIG. 5 is a view showing a schematic configuration of a radiation thermometer.

FIG. 5 is a view showing a schematic configuration of a radiation thermometer for use in measurement of the machining target material 30. This radiation thermometer is one that guides an infrared ray, which is emitted from an object 42, to an optical fiber 51, and measures a radiation temperature thereof, and includes the optical fiber 51, a condenser lens 54, a pyrometer 60, an oscilloscope 71, and a power supply 72.

This radiation thermometer guides the infrared ray, which is emitted from the object 42 located in an object region 41, by the optical fiber 51 including a cladding 52 and a core 53, and condenses the guided infrared ray by the condenser lens 54 made of a $BaF_2$ lens. Light thus condensed by the condenser lens 54 enters the pyrometer 60, and is detected via a Ge filter 61 individually by an InAs detector 62 and an InSb detector 63.

Signals detected by the InAs detector 62 and the InSb detector 63 are amplified individually by amplifiers 64, are supplied to the oscilloscope 71, and are recorded. The power supply 72 supplies power to the amplifiers 64 of the pyrometer 60.

Here, each of the InAs detector 62 and the InSb detector 63 has flat characteristics as frequency characteristics up to 400 kHz, and has sufficient performance for measuring a temperature change at the time of laser irradiation.

Figure 6:
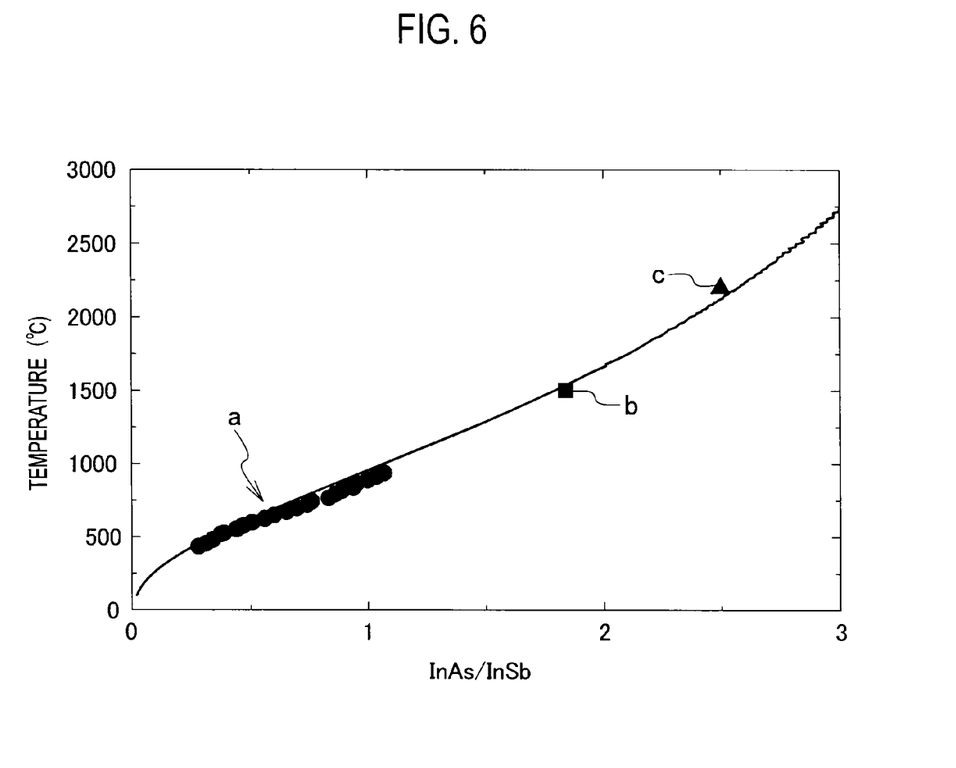
FIG. 6 is a view showing a calibration curve for the radiation thermometer.

FIG. 6 is a view showing a calibration curve for the radiation thermometer. Here, $Al_2O_3$ is used for a sample, a fiber is of the NSG type, a core material is chalcogenide glass, a core diameter is 380 μm, and a filter is Ge. In the diagram, measured values a indicate those of thermocouples, a measured value b indicates that of common steel SPCC in a fused state, and a measured value c indicates that of silicon carbide SiC in a fused state.

In this diagram, the measured values a, which remain within a temperature range up to 1000° C., are those by a thermocouple method, and sample temperatures were measured by the thermocouples. The measured values b and c, which are present in a range exceeding 1000° C., are those by a fusion method, and a melting point of the common steel and a decomposition point of the silicon carbide were used (refer to the foregoing Non-Patent Literature 2).

The diagram shows relationships between output ratios of the InAs detector 62 and the InSb detector 63, which are obtained as described above, and a temperature. A solid line in the diagram is a theoretical curve obtained from the respective spectral sensitivity characteristics of constituent components of the radiation thermometer. The output ratios obtained by the experiment and theoretical values coincide with each other satisfactorily, and temperature conversion in this embodiment was performed by the theoretical curve in the diagram.

Figure 7:
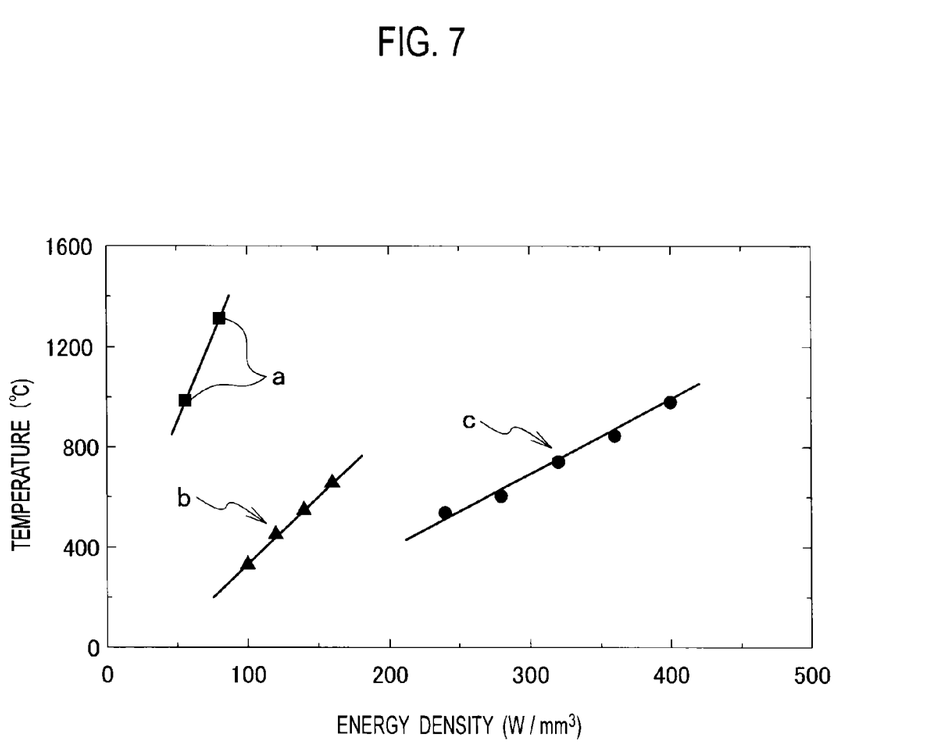
FIG. 7 is a diagram showing relationships between energy densities and a surface temperature of a laser-irradiated portion.

FIG. 7 is a diagram showing relationships between energy densities and a surface temperature of a laser-irradiated portion. In the diagram, measured values a indicate those in a case of the ceramic matrix composites, measured values b indicate those in a case of bulk materials of silicon carbide (SiC), and measured values c indicate those in a case of bulk materials of silicon nitride ($Si_3N_4$). An irradiation time is 1 second in any of the cases.

In any case of the materials indicating the measured values a to c, the temperature becomes higher as the energy density is becoming larger. Moreover, surface temperatures of the ceramic matrix composites in the measured values a are significantly higher in comparison with those of other bulk materials.

This results from thermal conductivity of each of the materials, and it is considered that the thermal conductivity of each of the ceramic matrix composites is reduced since the ceramic matrix composite forms a matrix. Hence, it is considered that, in comparison with other ceramic materials, it is easy to locally heat the ceramic matrix composite, and a thermal effect to the periphery after the laser irradiation can be reduced.

Figure 8:
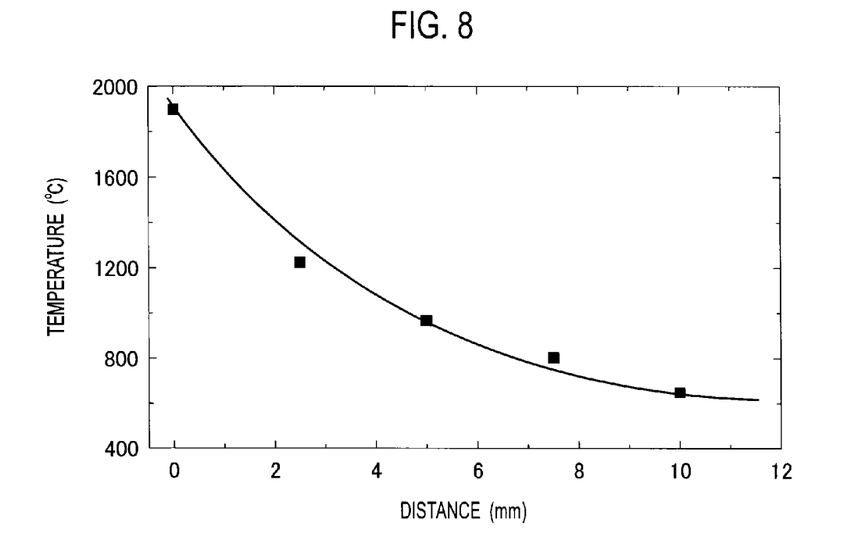
FIG. 8 is a diagram showing a relationship between a distance from the laser-irradiated portion and a temperature.

FIG. 8 is a diagram showing a relationship between a distance from the laser-irradiated portion 32 to a measurement position and temperature. Here, an irradiation mode of the laser is irradiation of the continuous oscillation (CW) laser light, and a laser output thereof is 50 W.

The temperature that was nearly 2000° C. on the laser-irradiated portion 32 was gradually lowered as the distance from the irradiated portion 32 is becoming larger, and was lowered to 700° C. or less at a position apart from the irradiated portion 32 by 10 mm. Namely, it can be said that a heated region is present even at a position apart from the laser-irradiated portion 32, and that there is a possibility that the temperature of the irradiated portion can be controlled by laser conditions and an irradiated position.

Figure 9:
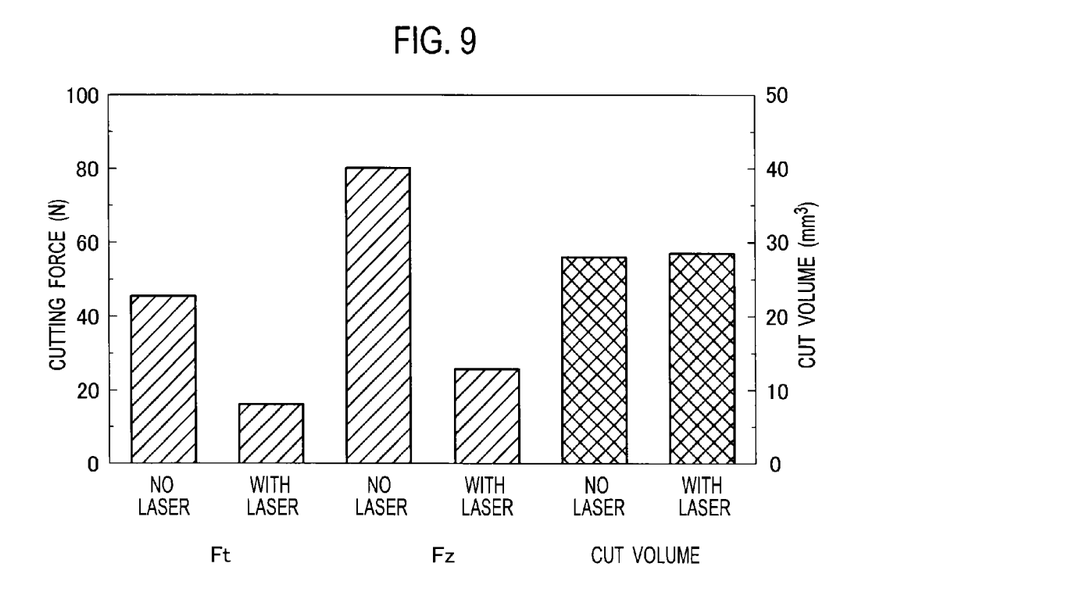
FIG. 9 is a diagram showing a relationship between laser assistance and cutting force.

FIG. 9 is a diagram showing an effect given to the cutting resistance by the laser assistance. Here, the cutting resistance was measured by the tool dynamometer 12 placed in the machining apparatus 10, and resultant force Ft of components Fx and Fy in the x-axis and y-axis directions was defined as cutting force N.

In the diagram, with regard to a case where the laser output was 40 W and the cutting was performed while separating the irradiated portion 32 and the cutting position apart by 5 mm from each other, Ft, Fz and cut volumes when no laser assistance is provided and when the laser assistance is provided are individually shown. From the diagram, it is obvious that, though actually cut volumes are substantially the same, the cutting resistance when the local heating was performed by the laser was significantly reduced in comparison with that of the case where the laser assistance is not provided.

Figure 10A:
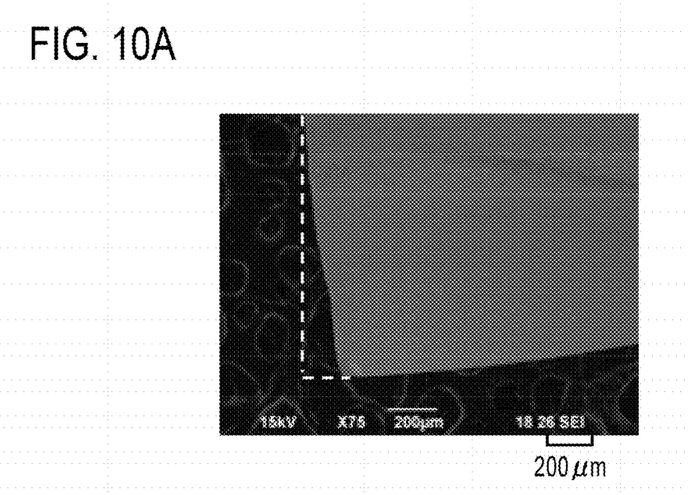
FIG. 10A is a view showing a SEM image of a rake face of an end mill with no laser assistance.
Figure 10B:
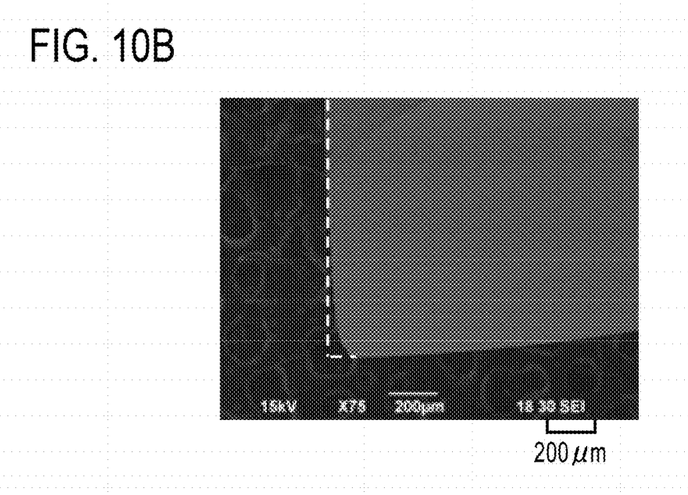
FIG. 10B is a view showing a SEM image of a rake face of an end mill with laser assistance.

FIGS. 10A and 10B are views showing abrasions of a rake face of the end mill 25. FIG. 10A shows an SEM image in the case where no laser assistance is provided, and FIG. 10B shows an SEM image in the case where the laser assistance is provided. When these are compared with each other, it is revealed that an abrasion loss of the end mill 25 is greatly reduced by performing the laser assistance.

As described above, for the ceramic matrix composite, applicability of the laser-assisted machining, which is aimed for improving machinability thereof, was studied. As a result, the effect of the laser assistance was able to be confirmed in the fields of the cutting resistance and the like, and the possibility that the laser assistance can be applied to the cutting/machining of the ceramic matrix composite was exhibited.

EXAMPLES

Figure 11:
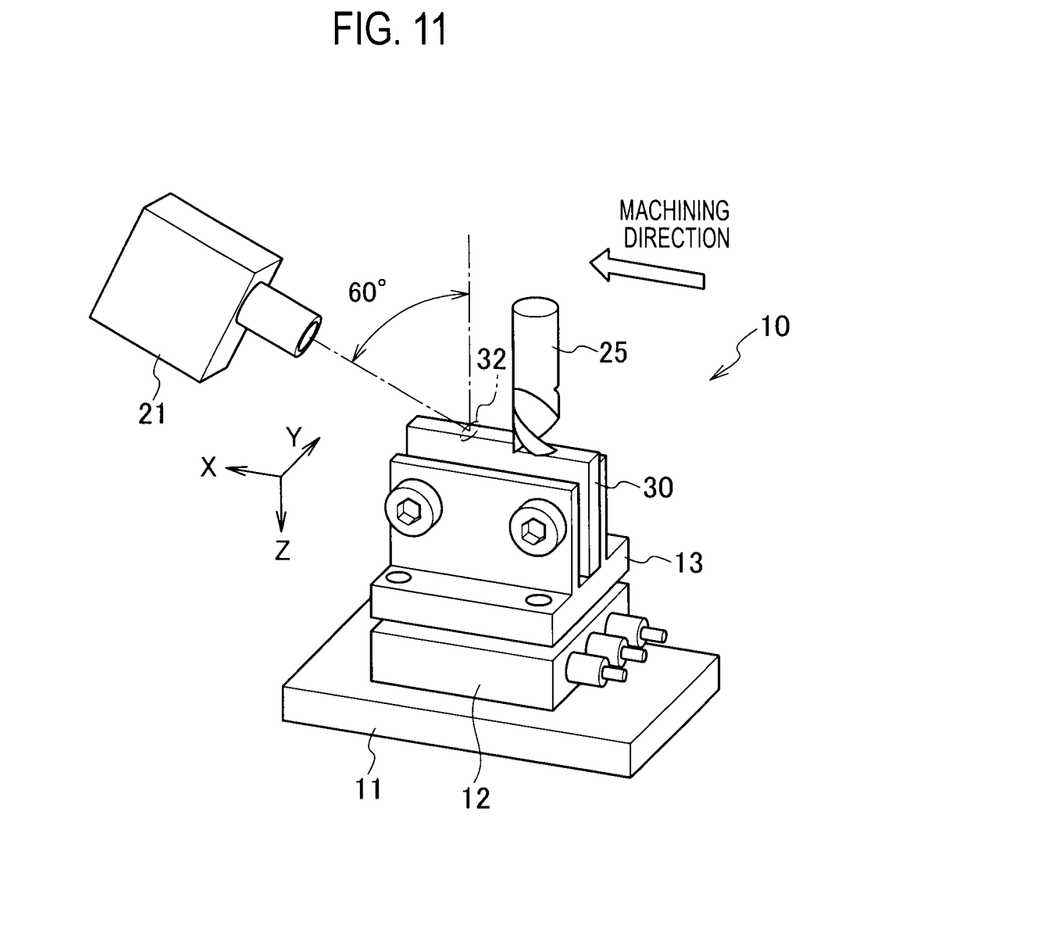
FIG. 11 is a view showing a schematic configuration of an embodiment of laser-assisted machining.

A description is made below of examples to which the present invention is applied. FIG. 11 is a view showing a schematic configuration of a machining apparatus 10 for use in the examples.

A laser head 21 of this machining apparatus 10 is configured to irradiate laser light in a direction inclined by 60° in the x-axis direction from the normal line of the upper surface of the table 11. Other configurations are similar to those of the above-mentioned machining apparatus 10 unless otherwise particularly specified, and accordingly, are referred to while being added with the same reference numerals.

Example 1

Table 1 shows machining conditions in this Example 1, and Table 2 shows laser irradiation conditions. In this Example 1, in accordance with S11 and S12, which are the first flow in FIG. 4, the laser light is irradiated onto the machining target material 30, and in addition, the cutting of the machining target material 30 is performed.

TABLE 1

| NUMBER OF REVOLUTIONS | 1300 rpm |
|---|---|
| AXIAL CUTTING DEPTH | 0.1 mm |
| CUTTING DISTANCE | 10 mm |
| FEEDING SPEED | 65 mm/min |
| FEEDING SPEED | 0.0125 mm/tooth |

TABLE 2

| LASER | SEMICONDUCTOR LASER |
|---|---|
| IRRADIATION MODE | CONTINUOUS OSCILLATION |
| LASER OUTPUT | 0-120 W |
| DISTANCE BETWEEN IRRADIATED PORTION AND CUTTING POSITION | 5.0 mm |
| BEAM DIAMETER | 0.4 × 4.1 mm |

Figure 12:
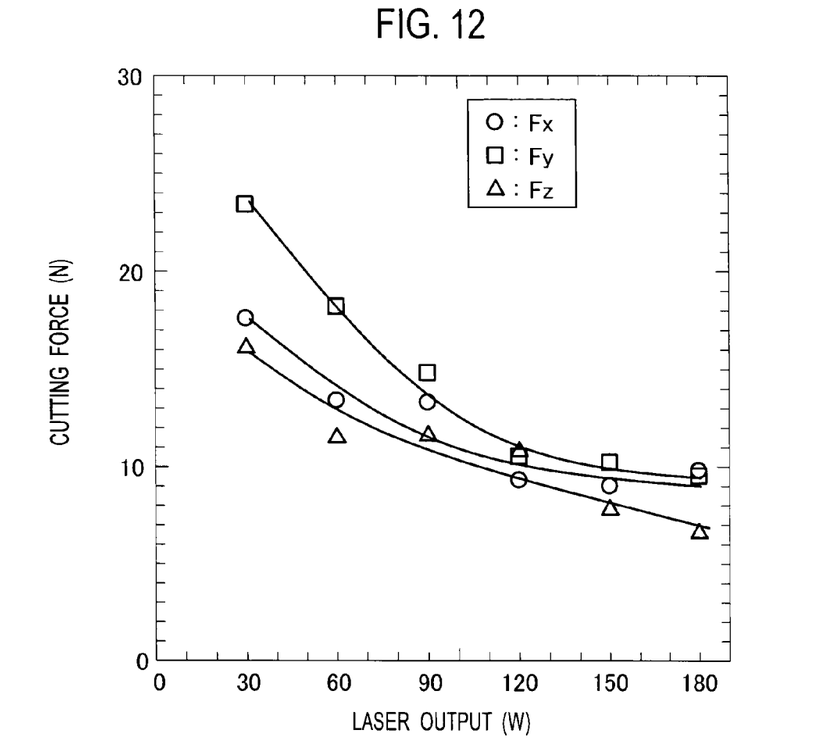
FIG. 12 is a diagram showing relationships between a laser output and the cutting force.

FIG. 12 is a diagram showing relationships between the laser output and the cutting force. In the diagram, relationships between the laser output and the components Fx, Fy and Fz of the cutting force in the xyz-axis directions are shown. Reduction of the cutting force is observed as the laser output is being increased. In this example, laser irradiation energy effective for the cutting/machining that takes the tool lifetime such as the end mill 25 into consideration is 90 W to 180 W.

Example 2

Table 3 shows laser irradiation conditions in this Example 2. Machining conditions are similar to those in Example 1. In this Example 2, in accordance with S11, S13 and S14, which are the second flow in FIG. 4, the surface of the machining target material 30 is removed or cut by the irradiation of the pulsed oscillation laser light thereonto, and thereafter, is removed by the cutting/machining.

TABLE 3

| LASER | Nd: YAG LASER |
|---|---|
| WAVELENGTH | 1064 nm |
| IRRADIATION MODE | PULSE OSCILLATION |

TABLE 3-continued

| | (Q SWITCH) |
|---|---|
| FREQUENCY | 1 kHz |
| PULSE WIDTH | 200 nS |
| PEAK POWER | 50, 70, 95, 115 kW |
| SCANNING SPEED | 0.1 mm/s |
| MACHINING OBJECT | CMC |

Figure 13:
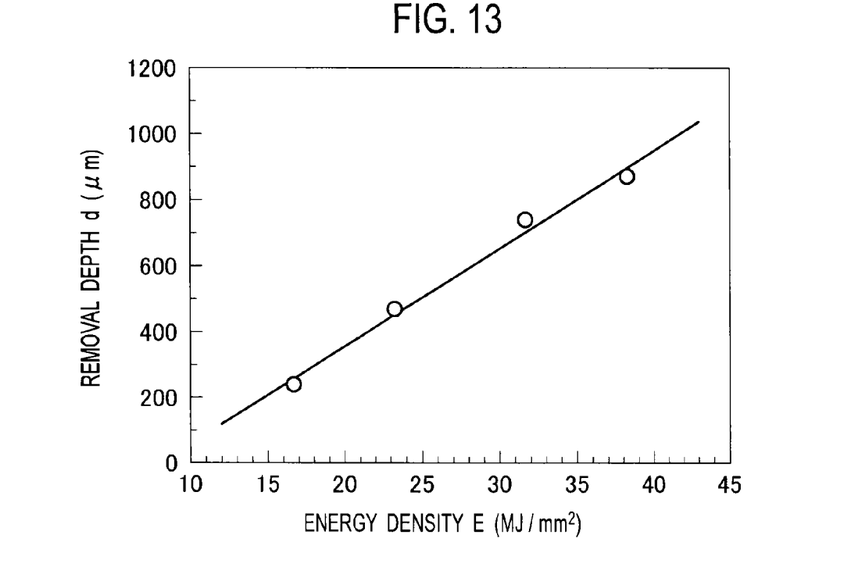
FIG. 13 is a diagram showing a relationship between the energy density and a removal depth.

FIG. 13 is a diagram showing a relationship between the energy density and the removal depth. It is observed that the removal depth is also increased in response to an increase of the energy density. In this Example 2, the energy density is controlled, whereby the removal depth from such a surface layer of the machining target material 30 can be set.

Example 3

Example 3 is one in which the irradiation of the continuous oscillation laser light of Example 1 and the irradiation of the pulsed oscillation laser light of Example 2 are combined with each other. By the irradiation of the continuous oscillation laser light, the surface of the machining target material 30 is heated up to the predetermined temperature to be thereby given the heat injury, and in addition, by the irradiation of the pulsed oscillation laser light with high energy, the cracks are formed on the surface of the machining target material 30 to thereby form the deteriorated layer, and this deteriorated layer is removed by the machining tool.

A flow of the laser light irradiation and the cutting in Example 3 may be either of S11 and S12, which are the first flow of performing the cutting together with the irradiation of the laser light, and S11, S13 and S14, which are the second flow of performing the cutting after ending the irradiation of the laser light onto the machining surface.

As described above, the irradiation of the continuous oscillation laser light and the irradiation of the pulsed oscillation laser light are combined with each other, whereby the cutting resistance can be reduced, and the machining speed can be enhanced. Moreover, the cutting ability can be enhanced, the crack propagation effect can be made high, and no limitations can be imposed on the tool and the machining shape. Moreover, for the tool, one subjected to coating such as diamond coating may be used.

The machining method of this embodiment can be applied to the ceramic matrix composite for use in a component applied to a high-temperature portion, which is for use in an airplane engine and includes, for example, a turbine blade, a nozzle, an exhaust component and the like, and for use in heat-resistant components for use in a rocket and a flying object, the heat-resistant components including a nozzle, a chamber and the like.

DESCRIPTION OF SYMBOLS

10 MACHINING APPARATUS
11 TABLE
12 TOOL DYNAMOMETER
13 VISE
21 LASER HEAD
25 END MILL
30 MACHINING TARGET MATERIAL
32 IRRADIATED PORTION

The invention claimed is:

1. A method for machining a ceramic matrix composite, the method comprising:
    a step of scanning an irradiated portion of a surface of a machining target material by laser light to irradiate the irradiated portion with the laser light, and forming a deteriorated layer on the irradiated portion of the surface of the machining target material; and a step of removing the deteriorated layer by a machining tool, the deteriorated layer being formed on the irradiated portion, wherein the deteriorated layer is formed by heating the irradiated portion up to a predetermined temperature by irradiation of continuous oscillation laser light, and by forming a crack by irradiation of pulsed oscillation laser light.

2. The method according to claim 1, wherein, in the step of removing the deteriorated layer, the deteriorated layer formed on the irradiated portion is sequentially removed by the machining tool, which machining tool follows the irradiated portion apart from the irradiated portion by a predetermined distance.

3. The method according to claim 2, wherein the machining tool is an end mill.

4. The method according to claim 1, wherein, in the step of forming a deteriorated layer, the deteriorated layer is formed in a predetermined region of the surface of the machining target material, and in the step of removing the deteriorated layer, the deteriorated layer is removed after the deteriorated layer is formed in the predetermined region.

* * * * *